US008675021B2

(12) United States Patent
Reusens et al.

(10) Patent No.: US 8,675,021 B2
(45) Date of Patent: Mar. 18, 2014

(54) COORDINATION AND COMBINATION OF VIDEO SEQUENCES WITH SPATIAL AND TEMPORAL NORMALIZATION

(75) Inventors: Emmanuel Reusens, Palezieux (CH); Martin Vetterli, Grandvaux (CH); Serge Ayer, Farvagny (CH); Victor Bergonzoli, Atlanta, GA (US)

(73) Assignee: Dartfish SA, Fribourg (CH)

( * ) Notice: Subject to any disclaimer, the term of this patent is extended or adjusted under 35 U.S.C. 154(b) by 512 days.

(21) Appl. No.: 12/555,841

(22) Filed: Sep. 9, 2009

(65) Prior Publication Data

US 2009/0324191 A1  Dec. 31, 2009

Related U.S. Application Data

(62) Division of application No. 10/148,114, filed as application No. PCT/US00/32117 on Nov. 24, 2000, now abandoned.

(60) Provisional application No. 60/167,367, filed on Nov. 24, 1999.

(51) Int. Cl.
*G09G 5/00* (2006.01)
*H04N 9/74* (2006.01)

(52) U.S. Cl.
USPC .......................................... 345/639; 348/584

(58) Field of Classification Search
CPC ............... G06T 2219/2004; G06T 7/0024; H04N 5/265; H04N 5/272; H04N 5/2628
USPC ........... 345/629, 634, 639, 640; 348/584, 586
See application file for complete search history.

(56) References Cited

U.S. PATENT DOCUMENTS

| 4,157,572 A | 6/1979 | Kennedy et al. |
| 4,168,510 A | 9/1979 | Kaiser |
| 4,183,056 A | 1/1980 | Evans et al. |
| 4,364,086 A | 12/1982 | Guth |
| 4,713,695 A | 12/1987 | Macheboeuf |
| 4,777,641 A | 10/1988 | Ingaki et al. |

(Continued)

FOREIGN PATENT DOCUMENTS

| CN | 1425171 A1 | 6/2003 |
| DE | 41 35 385 A1 | 5/1992 |

(Continued)

OTHER PUBLICATIONS

Dartfish About us webpage, http://www.dartfish.com/en/about-us/index.htm, Aug. 13, 2010, pp. 1-4.*

(Continued)

*Primary Examiner* — Jeffery A Brier
(74) *Attorney, Agent, or Firm* — Blank Rome LLP

(57) ABSTRACT

Given two video sequences, a composite video sequence can be generated (15) which includes visual elements from each of the given sequences, suitably synchronized (11) and represented in a chosen focal plane. A composite video sequence can be made also by similarly combining a video sequence with an audio sequence. In the composite video sequence, contestants, action figures or objects can be shown against a common background (12) even if the given video sequences differ as to background, with the common background taken from one or the other of the given sequences, for example. Alternatively, a different suitable background can be used, e.g. as derived from the given video sequences, as obtained from another video sequence or image, or as otherwise synthesized.

54 Claims, 12 Drawing Sheets

(56) References Cited

U.S. PATENT DOCUMENTS

| | | | |
|---|---|---|---|
| 4,842,483 A | 6/1989 | Geary |
| 4,974,073 A | 11/1990 | Inova |
| 5,055,926 A | 10/1991 | Christensen et al. |
| 5,107,252 A | 4/1992 | Traynar et al. |
| 5,111,410 A | 5/1992 | Nakayama et al. |
| 5,367,286 A | 11/1994 | Voillat |
| 5,423,554 A | 6/1995 | Davis |
| 5,432,528 A | 7/1995 | Ritter |
| 5,444,478 A | 8/1995 | Lelong et al. |
| 5,502,482 A | 3/1996 | Graham |
| 5,566,251 A * | 10/1996 | Hanna et al. ............... 382/284 |
| 5,629,988 A | 5/1997 | Burt et al. |
| 5,729,471 A | 3/1998 | Jain |
| 5,751,368 A | 5/1998 | Cooper |
| 5,764,283 A | 6/1998 | Pingali et al. |
| 5,850,352 A | 12/1998 | Moezzi |
| 5,896,128 A | 4/1999 | Boyer |
| 5,923,365 A | 7/1999 | Tamir et al. |
| 5,953,056 A | 9/1999 | Tucker |
| 6,034,740 A | 3/2000 | Mitsui |
| 6,122,013 A | 9/2000 | Tamir et al. |
| 6,124,862 A | 9/2000 | Boyken et al. |
| 6,201,579 B1 | 3/2001 | Tamir et al. |
| 6,320,624 B1 | 11/2001 | Ayer et al. |
| 6,388,669 B2 | 5/2002 | Minami |
| 6,441,846 B1 | 8/2002 | Carlbom et al. |
| 6,483,511 B1 | 11/2002 | Snyder |
| 6,522,787 B1 | 2/2003 | Kumar et al. |
| 7,042,493 B2 | 5/2006 | Prandoni et al. |
| 7,843,510 B1 | 11/2010 | Ayer et al. |

FOREIGN PATENT DOCUMENTS

| | | |
|---|---|---|
| EP | 0 669 758 A1 | 8/1995 |
| EP | 1 289 282 B1 | 3/2003 |
| JP | 2004-500756 T | 1/2004 |
| WO | 9505873 | 3/1995 |
| WO | WO 99/37088 * | 7/1999 |
| WO | 01/26760 A2 | 4/2001 |
| WO | 01/39130 A1 | 5/2001 |
| WO | 01/78050 A3 | 10/2001 |
| WO | 02/104009 A1 | 12/2002 |
| WO | 2007/006346 A1 | 1/2007 |

OTHER PUBLICATIONS

Yaron Caspi and Michal Irani, A Step Towards Sequence-to-Sequence Alignment, Jun. 13, 2000, in Computer Vision and Pattern Recognition, 2000, Proceedings, IEEE Conference on, IEEE, vol. 2, pp. 682-689.*

L. Lucchese et al., "Color Image Segmentation: A State-of-the-Art Survey," XP-002244932, Mar. 2001, pp. 207-221.

E.D. Dickmanns, "The 4D-Approach to Dynamic Machine Vision," Proceedings of the 33rd IEEE Conference on Decision and Control, vol. 4, 1994, pp. 3770-3775.

A. Akusta et al., "Video interface for spatiotemporal interactions based on multi-dimensional video computing," vol. 1, Apr. 21, 1997, pp. 191-194, XP010226167, Acoustics, Speech & Signal Processing, 1997, ICASSp-97, 1997 IEEE Int'l Conference in Munich, Germany, Apr. 21-24, 1997.

J. Davis et al., "Real-time Motion Template Gradients using Intel CVLib," Sep. 1999, pp. 1-20, XP002331182, IEEE, ICCV Workshop on Frame-Rate Vision.

* cited by examiner

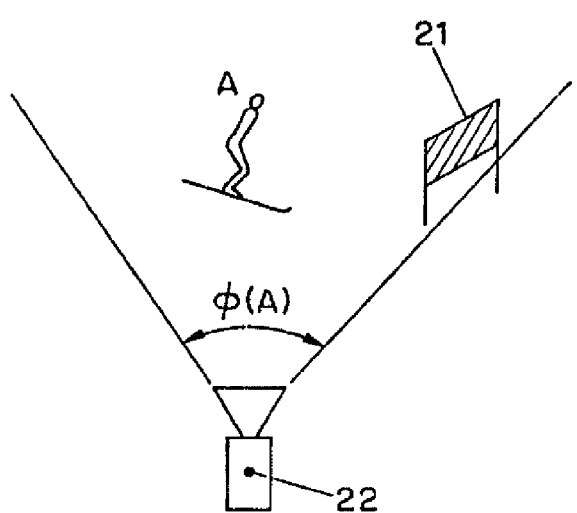
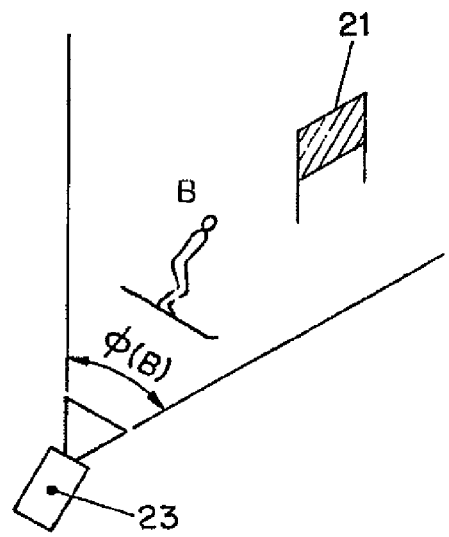
FIG. 2A
FIG. 2B
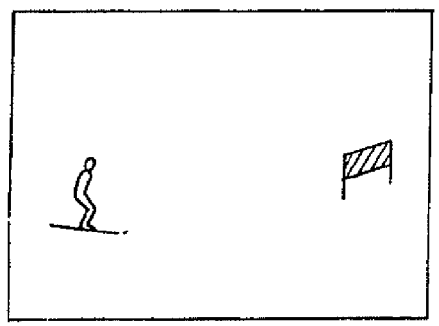
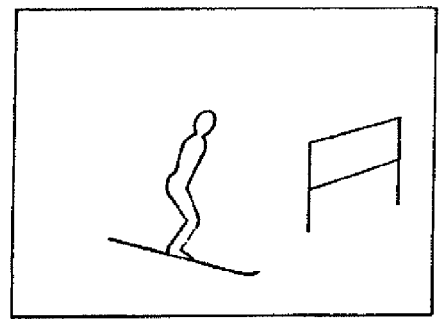
FIG. 3A
FIG. 3B

*FIG. 15*
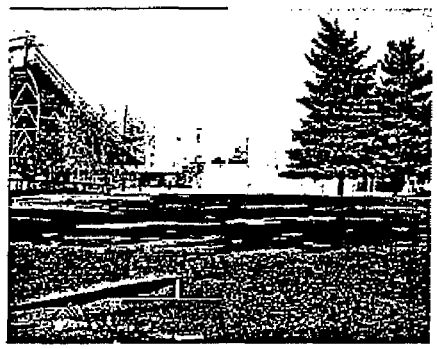
BGD1
FRAME #1 OF IS1
BGD2
FRAME #1 OF IS2
FRAME #1 OF COMPOSITE SEQUENCE

FIG. 16
(a)
(b)

COORDINATION AND COMBINATION OF VIDEO SEQUENCES WITH SPATIAL AND TEMPORAL NORMALIZATION

CROSS-REFERENCE TO RELATED APPLICATIONS

This application is a Division of U.S. application Ser. No. 10/148,114, filed on May 24, 2002, now abandoned, which is a National Phase of PCT US00/32117, filed on Nov. 24, 2000, which claims priority to U.S. Provisional Application No. 60/167,367, filed Nov. 24, 1999.

TECHNICAL FIELD

The present invention relates to visual displays and, more specifically, to time-dependent visual displays.

BACKGROUND OF THE INVENTION

In video displays, e.g. in sports-related television programs, special visual effects can be used to enhance a viewer's appreciation of the action. For example, in the case of a team sport such as football, instant replay affords the viewer a second chance at "catching" critical moments of the game. Such moments can be replayed in slow motion, and superposed features such as hand-drawn circles, arrows and letters can be included for emphasis and annotation. These techniques can be used also with other types of sports such as racing competitions, for example.

With team sports techniques of instant replay and the like are most appropriate, as scenes typically are busy and crowded. Similarly, e.g. in the 100-meter dash competition, the scene includes the contestants side-by-side, and slow-motion visualization at the finish line brings out the essence of the race. On the other hand, where starting times are staggered e.g. as necessitated for the sake of practicality and safety in the case of certain racing events such as downhill racing or ski jumping the actual scene typically includes a single contestant.

SUMMARY OF THE INVENTION

For enhanced visualization, by the sports fan as well as by the contestant and his coach, displays are desired in which the element of competition between contestants is manifested. This applies especially where contestants perform sole as in downhill skiing, for example, and can be applied also to group races in which qualification schemes are used to decide who will advance from quarter-final to half-final to final.

We have recognized that, given two or more video sequences, a composite video sequence can be generated which includes visual elements from each of the given sequences, suitably synchronized and represented in a chosen focal plane. For example, given two video sequences with each showing a different contestant individually racing the same down-hill course, the composite sequence can include elements from each of the given sequences to show the contestants as if racing simultaneously. A composite video sequence can be made also by similarly combining one or more video sequences with one or more different sequences such as audio sequences, for example.

In the composite video sequence, contestants, action figures or objects can be shown against a common background even if the given video sequences differ as to background, with the common background taken from one or the other of the given sequences, for example. Alternatively, a different suitable background can be used, e.g. as derived from the given video sequences, as obtained from another video sequence or image, or as otherwise synthesized.

BRIEF DESCRIPTION OF THE DRAWING

FIGS. 2A and 2B are schematics of different downhill skiers passing before a video camera.

FIGS. 3A and 3B are schematics of images recorded by the video camera, corresponding to FIGS. 2A and 2B.

FIG. 15 consists of five image representations, illustrating a use of a preferred embodiment of the invention as applied to the game of golf.

FIG. 16 consists of two images, illustrating composite effects which can be achieved in accordance with preferred embodiments of the invention.

DETAILED DESCRIPTION

Conceptually, the invention can be appreciated in analogy with 2-dimensional (2D) "morphing", i.e. the smooth transformation, deformation or mapping of one image, I1, into another, I2, in computerized graphics. Such morphing leads to a video sequence which shows the transformation of I1 into I2, e.g., of an image of an apple into an image of an orange, or of one human face into another. The video sequence is 3-dimensional, having two spatial and a temporal dimension. Parts of the sequence may be of special interest, such as intermediate images, e.g. the average of two faces, or composites, e.g. a face with the eyes from I1 and the smile from I2. Thus, morphing between images can be appreciated as a form of merging of features from the images.

The invention is concerned with a more complicated task, namely the merging of two video sequences. The morphing or mapping from one sequence to another leads to 4-dimensional data which cannot be displayed easily. However, any intermediate combination, or any composite sequence leads to a new video sequence.

Of particular interest is the generation of a new video sequence combining elements from two or more given sequences, with suitable spatio-temporal alignment or synchronization, and projection into a chosen focal plane. For example, in the case of a sports racing competition such as downhill skiing, video sequences obtained from two contestants having traversed a course separately can be time-synchronized by selecting the frames corresponding to the start of the race. Alternatively, the sequences may be synchronized for coincident passage of the contestants at a critical point such as a slalom gate, for example.

The chosen focal plane may be the same as the focal plane of the one or the other of the given sequences, or it may be suitably constructed yet different from both.

Of interest also is synchronization based on a distinctive event, e.g., in track and field, a high-jump contestant lifting off from the ground or touching down again. In this respect it is of further interest to synchronize two sequences so that both lift-off and touch-down coincide, requiring time scaling. The resulting composite sequence affords a comparison of trajectories.

With the video sequences synchronized, they can be further aligned spatially, e.g. to generate a composite sequence giving the impression of the contestants traversing the course simultaneously. In a simple approach, spatial alignment can be performed on a frame-by-frame basis. Alternatively, by taking a plurality of frames from a camera into consideration, the view in an output image can be extended to include background elements from several sequential images.

Figure 1:
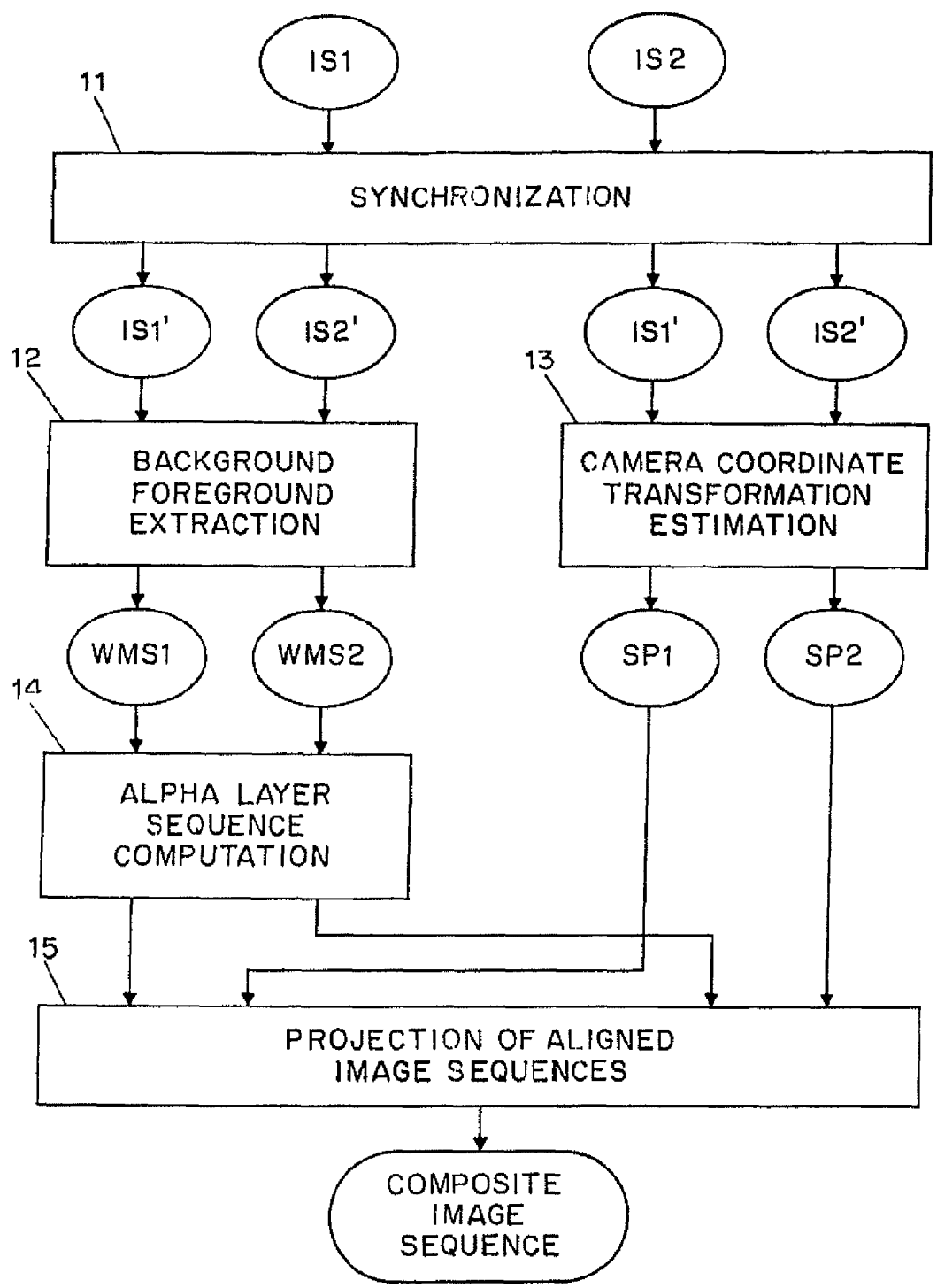
FIG. 1 is a block diagram of a preferred embodiment of the invention.

Forming a composite image involves representing component scenes in a chosen focal plane, typically requiring a considerable amount of computerized processing using a computer processor, e.g. as illustrated by FIG. 1 for the special case of two video input sequences. A non-transitory medium can also be provided with computer instructions which generate the composite video sequence.

FIG. 1 shows two image sequences IS1 and IS2 being fed to a module 11 for synchronization into synchronized sequences IS1' and IS2'. For example, the sequences IS1 and IS2 may have been obtained for two contestants in a down-hill racing competition, and they may be synchronized by the module 11 so that the first frame of each sequence corresponds to its contestant leaving the starting gate.

The synchronized sequences are fed to a module 12 for background-foreground extraction, as well as to a module 13 for camera coordinate transformation estimation. For each of the image sequences, the module 12 yields a weight-mask sequence (WMS), with each weight mask being an array having an entry for each pixel position and differentiating between the scene of interest and the background/foreground. The generation of the weight mask sequence involves computerized searching of images for elements which, from frame to frame, move relative to the background. The module 13 yields sequence parameters SP1 and SP2 including camera angles of azimuth and elevation, and camera focal length and aperture among others. These parameters can be determined from each video sequence by computerized processing including interpolation and matching of images. Alternatively, a suitably equipped camera can furnish the sequence parameters directly, thus obviating the need for their estimation by computerized processing.

The weight-mask sequences WMS1 and WMS2 are fed to a module 13 for "alpha-layer" sequence computation. The alpha layer is an array which specifies how much weight each pixel in each of the images should receive in the composite image.

The sequence parameters SP1 and SP2 as well as the alpha layer are fed to a module 15 for projecting the aligned image sequences in a chosen focal plane, resulting in the desired composite image sequence. This is exemplified further by FIGS. 2A, 2B, 3A, 3B, 4 and 5

FIG. 2A shows a skier A about to pass a position marker 21, with the scene being recorded from a camera position 22 with a viewing angle $\phi(A)$. The position reached by A may be after an elapse of $t(A)$ seconds from A's leaving the starting gate of a race event.

FIG. 2B shows another skier, B, in a similar position relative to the marker 21, and with the scene being recorded from a different camera position 23 and with a different, more narrow viewing angle $\phi(B)$. For comparison with skier A, the position of skier B corresponds to an elapse of $t(A)$ seconds from B leaving the starting gate. As illustrated, within $t(A)$ seconds skier B has traveled farther along the race course as compared with skier A.

FIGS. 3A and 3B show the resulting respective images.

Figure 4:
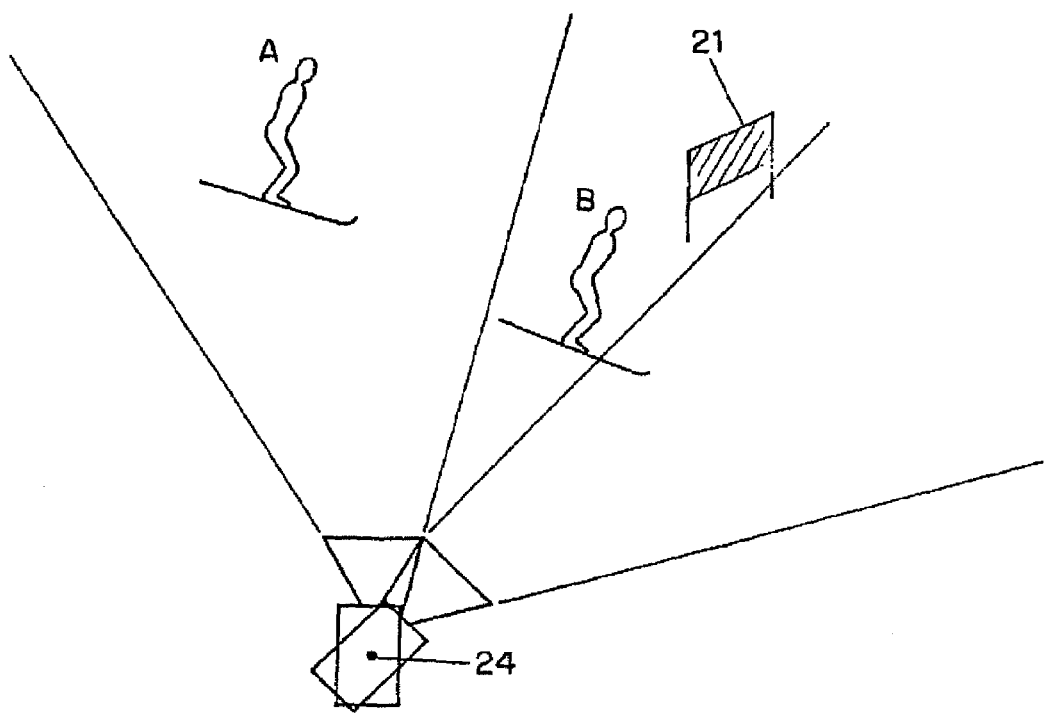
FIG. 4 is a schematic of FIGS. 2A and 2B combined.

FIG. 4 shows a combination with FIGS. 2A and 2B superposed at a common camera location.

Figure 5:
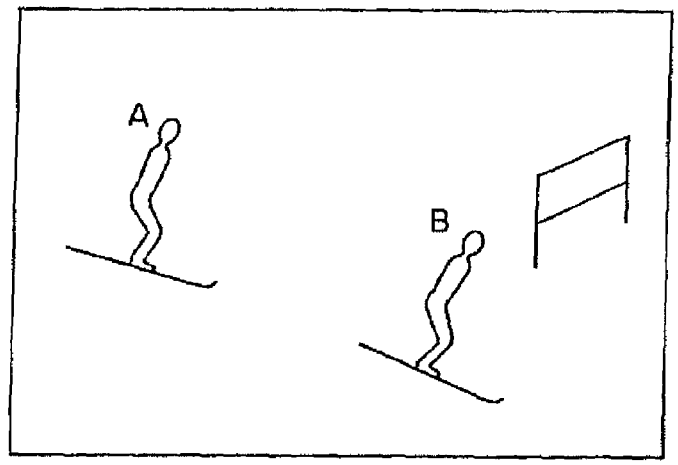
FIG. 5 is a schematic of the desired video image, with the scenes of FIGS. 3A and 3B projected in a chosen focal plane.

FIG. 5 shows the resulting desired image projected in a chosen focal plane, affording immediate visualization of skiers A and B as having raced jointly for $t(A)$ seconds from a common start.

Figure 6:
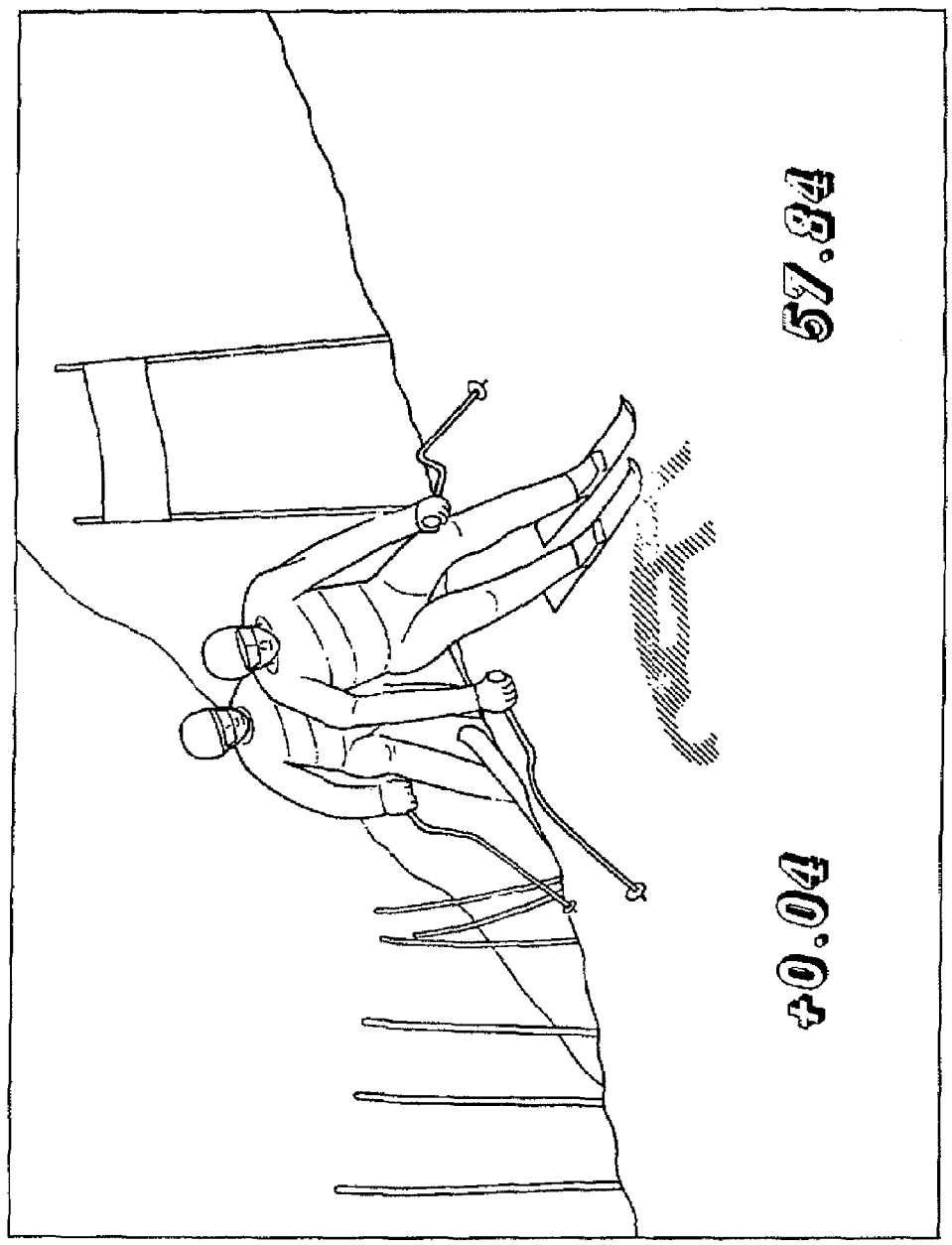
FIG. 6 is a frame from a composite video sequence which was made with a prototype implementation of a preferred embodiment of the invention.

FIG. 6 shows a frame from a composite image sequence generated by a prototype implementation of the technique, with the frame corresponding to a point of intermediate timing. The value of 57.84 is the time, in seconds, that it took the slower skier to reach the point of intermediate timing, and the value of +0.04 (seconds) indicates by how much he is trailing the faster skier.

The prototype implementation is used for enhanced processing efficiency, and especially for signal processing involving matching and interpolation.

Individual aspects and variations of the technique are described below in further detail.

A. Background/Foreground Extraction

In each sequence, background and foreground can be extracted using a suitable motion estimation method. This method should be "robust", for background/foreground extraction where image sequences are acquired by a moving camera and where the acquired scene contains moving agents or objects. Required also is temporal consistency, for the extraction of background/foreground to be stable over time. Where both the camera and the agents are moving predictably, e.g. at constant speed or acceleration, temporal filtering can be used for enhanced temporal consistency.

Based on determinations of the speed with which the background moves due to camera motion, and the speed of the skier with respect to the camera, background/foreground extraction generates a weight layer which differentiates between those pixels which follow the camera and those which do not. The weight layer will then be used to generate an alpha layer for the final composite sequence.

B. Spatio-Temporal Alignment of Sequences

Temporal alignment involves the selection of corresponding frames in the sequences, according to a chosen criterion. Typically, in sports racing competitions, this is the time code of each sequence delivered by the timing system, e.g. to select the frames corresponding to the start of the race. Other possible time criteria are the time corresponding to a designated spatial location such as a gate or jump entry, for example.

Spatial alignment is effected by choosing a reference coordinate system for each frame and by estimating the camera coordinate transformation between the reference system and the corresponding frame of each sequence. Such estimation may be unnecessary when camera data such as camera position, viewing direction and focal length are recorded along with the video sequence. Typically, the reference coordinate system is chosen as one of the given sequences—the one to be used for the composite sequence. As described below, spatial alignment may be on a single-frame or multiple-frame basis.

B.1 Spatial Alignment on a Single-Frame Basis

At each step of this technique, alignment uses one frame from each of the sequences. As each of the sequences includes moving agents/objects, the method for estimating the camera coordinate transformation needs to be robust. To this end, the masks generated in background/foreground extraction can be used. Also, as motivated for background/foreground extraction, temporal filtering can be used for enhancing the temporal consistency of the estimation process.

B.2 Spatial Alignment on a Multiple-Frame Basis

In this technique, spatial alignment is applied to reconstructed images of the scene visualized in each sequence. Each video sequence is first analyzed over multiple frames for reconstruction of the scene, using a technique similar to the one for background/foreground extraction, for example. Once each scene has been separately reconstructed, e.g. to take in as much background as possible, the scenes can be spatially aligned as described above.

This technique allows free choice of the field of view of every frame in the scene, in contrast to the single-frame technique where the field of view has to be chosen as the one of the reference frame. Thus, in the multiple-frame technique, in case that all contestants are not visible in all the frames, the field and/or angle of view of the composite image can be chosen such that all competitors are visible.

C. Superimposing of Video Sequences

After extraction of the background/foreground in each sequence and estimation of the camera coordinate transformation between each sequence and a reference system, the sequences can be projected into a chosen focal plane for simultaneous visualization on a single display. Alpha layers for each frame of each sequence are generated from the multiple background/foreground weight masks. Thus, the composite sequence is formed by transforming each sequence into the chosen focal plane and superimposing the different transformed images with the corresponding alpha weight.

D. Applications

Further to skiing competitions as exemplified, the techniques of the invention can be applied to other speed/distance sports such as car racing competitions and track and field, for example.

Further to visualizing, one application of a composite video sequence made in accordance with the invention is apparent from FIG. 6, namely for determining differential time between two runners at any desired location of a race. This involves simple counting of the number of frames in the sequence between the two runners passing the location, and multiplying by the time interval between frames.

A composite sequence can be broadcast over existing facilities such as network, cable and satellite TV, and as video on the Internet, for example. Such sequences can be offered as on-demand services, e.g. on a channel separate from a strictly real-time main channel. Or, instead of by broadcasting over a separate channel, a composite video sequence can be included as a portion of a regular channel, displayed as a corner portion, for example.

In addition to their use in broadcasting, generated composite video sequences can be used in sports training and coaching. And, aside from sports applications, there are potential industrial applications such as car crash analysis, for example.

It is understood that composite sequences may be higher-dimensional, such as composite stereo video sequences.

In yet another application, one of the given sequences is an audio sequence to be synchronized with a video sequence. Specifically, given a video sequence of an actor or singer, A, speaking a sentence or singing a song, and an audio sequence of another actor, B, doing the same, the technique can be used to generate a voice-over or "lip-synch" sequence of actor A speaking or singing with the voice of B. In this case, which requires more than mere scaling of time, dynamic programming techniques can be used for synchronization.

The spatio-temporal realignment method can be applied in the biomedical field as well. For example, after orthopedic surgery, it is important to monitor the progress of a patient's recovery. This can be done by comparing specified movements of the patient over a period of time. In accordance with an aspect of the invention, such a comparison can be made very accurately, by synchronizing start and end of the movement, and aligning the limbs to be monitored in two or more video sequences.

Another application is in car crash analysis. The technique can be used for precisely comparing the deformation of different cars crashed in similar situations, to ascertain the extent of the difference. Further in car crash analysis, it is important to compare effects on crash dummies. Again, in two crashes with the same type of car, one can precisely compare how the dummies are affected depending on configuration, e.g. of safety belts.

E. Spatial and Temporal Normalization

Figure 7:
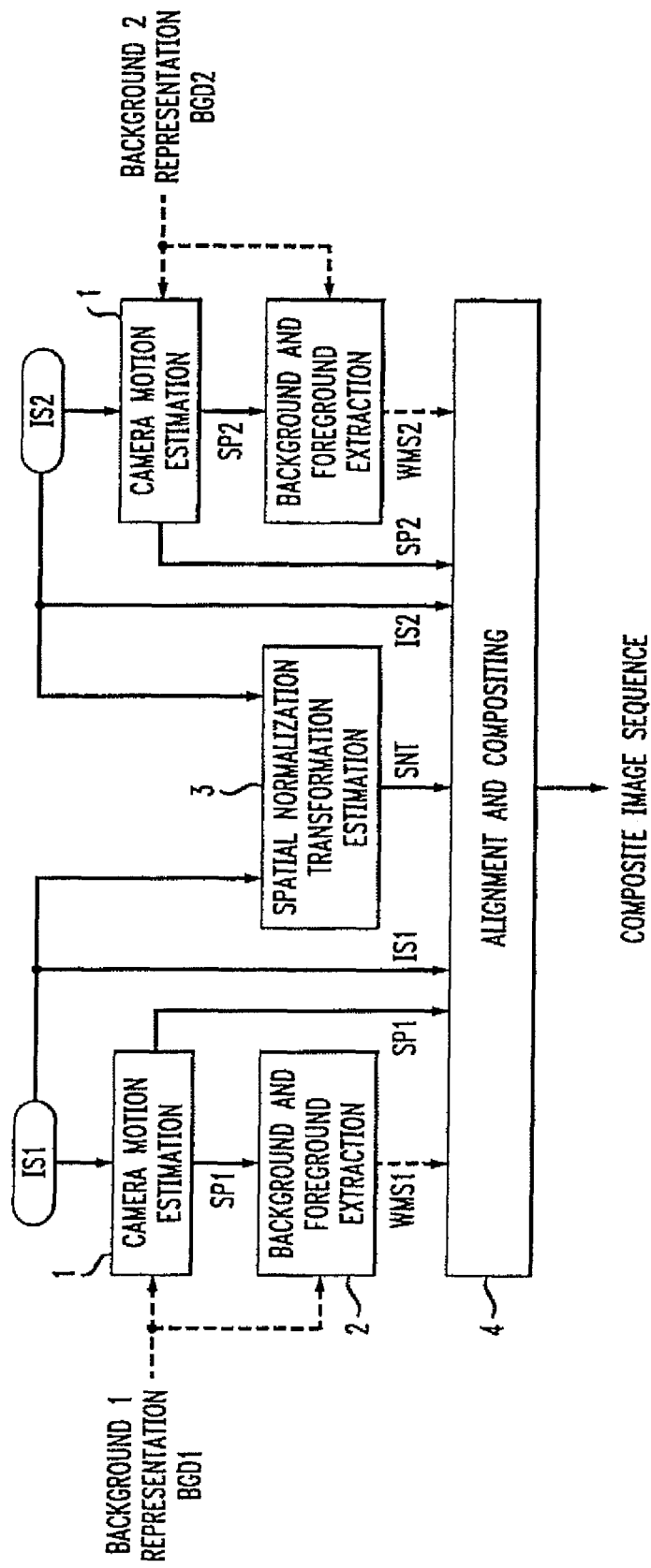
FIG. 7 is a block diagram of a preferred embodiment of the invention comprising background adaptation, wherein, in a composite video sequence, action figures are shown against a common background which need not be a shared background of the given video sequences.

FIG. 7 shows image sequences IS1 and IS2 being fed into respective modules 1 yielding respective parameter sequences SP1 and SP2 which describe the transformation of each frame with respect to respective background representations BGD1 and BGD2. Each of the parameters describes how a frame geometrically relates to the respective background.

Figure 8:
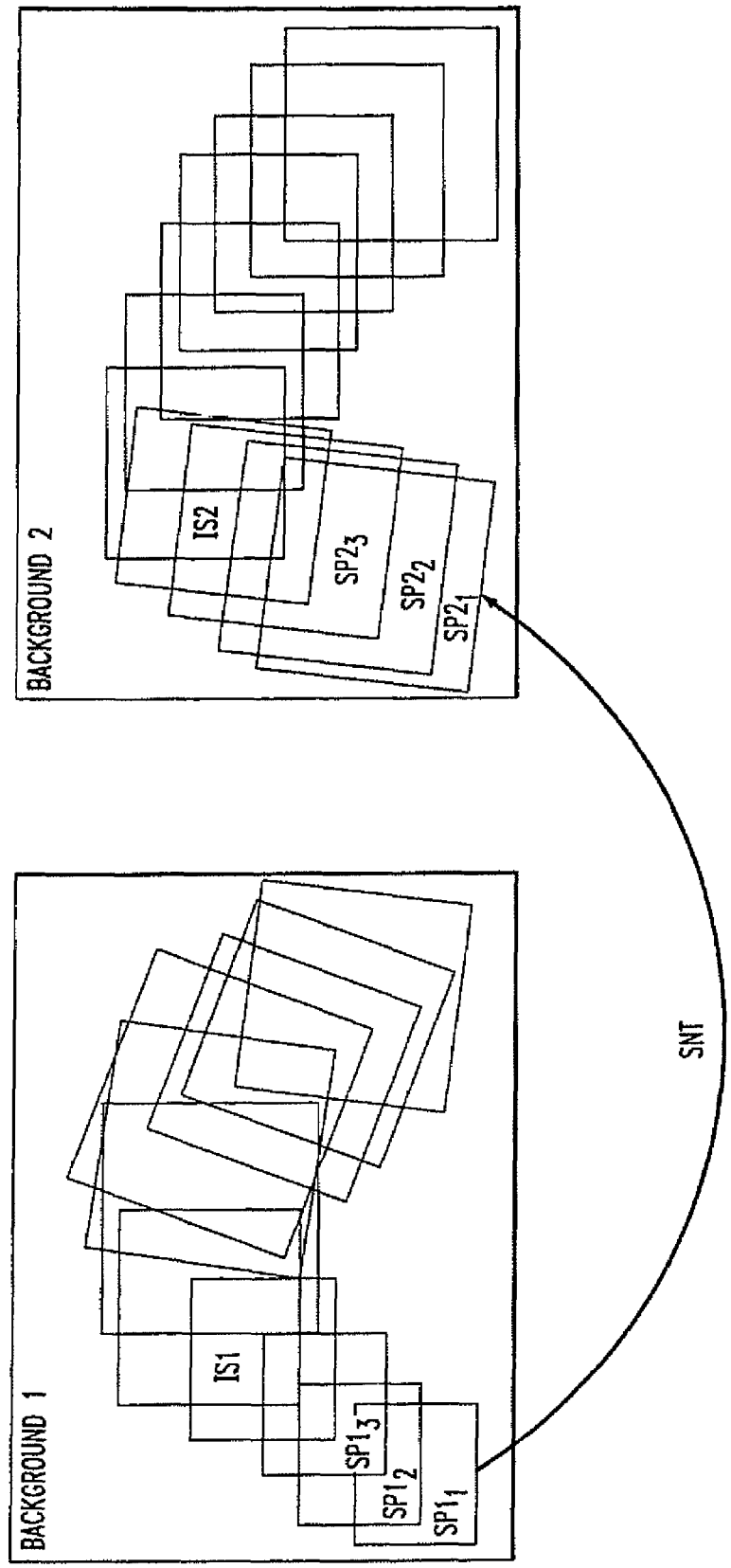
FIG. 8 is a schematic which illustrates establishing a frame-to-frame correspondence between frames of one video sequence and frames of another video sequence.

The parameter sequences SP1 and SP2 are fed into the respective module 2, each for generating a sequence of respective weight masks WMS1 and WMS2 giving for each pixel entry a discrimination measure of foreground versus background. For example, such weights may represent a probability of a pixel to belong to the background. The two image sequences IS1 and IS2 in parallel are fed into the module 3 for estimation of a spatial normalization transformation SNT that expresses how the two sequences should relate geometrically, as illustrated in FIG. 8.

SP1 and SP2 describe how each frame of IS1 and IS2 relates to its respective background BGD1 and BGD2. be aligned to its corresponding frame in IS1. Using their corresponding weight masks, the module 4 blends the aligned frames into a composite frame. The concatenation of the composite frames yields the composite image sequence showing two coordinated foreground objects moving together against a background which may be the background of SP1, or the background of SP2, or another desired background.

The technique extends to where there are more than two foreground objects/agents in a scene, e.g. several players and/or a further object such as a ball in sports such as basketball, football, soccer and tennis, for example. The technique can be applied readily also for generating a combined sequence from three or more given sequences, then showing more than two coordinated foreground objects. The following detailed description of individual aspects and variations of the technique extends correspondingly.

E.0 Construction of Background Representation

A background representation is understood as a representation of the environment in which an action takes place, e.g. a single recorded image, recorded from at least approximately the same position as the image sequence to be processed, but with a sufficiently wide angle to represent the environment of a scene in its entirety. Alternatively, the background representation may be formed as a panoramic image, reconstructed from an image sequence covering an entire scene and recorded from a similar camera position. Further alternatives include a parametric description of a simple environment/background, e.g. a tennis court, or a synthetic background of a single color or a simple pattern.

Background representation is not limited to a pixel representation but can include a probabilistic model measuring the reliability of the representation at a specific point. Such a measure can help in classifying as to foreground versus background in foreground/background extraction processing. Typically, higher tolerance/deviance will be admitted for less reliable pixels.

The background representation BGD1 or BGD2 can be inferred also from an image sequence IS1 or IS2 directly. If an agent/object is moving against the background, an image can be found in IS1 or IS2, respectively, in which a specific portion of the background is not occluded so that it can be used to construct the background representation BGD1 or BGD2 respectively. This approach may be preferred in the interest of robustness in case of variations in image brightness.

E.1 Camera Motion Parameter Estimation (Module 1)

Modules 1 of FIG. 7 compute the transformation coordinates SP1 and SP2, where SP1 describes the geometrical relation between each frame of IS1 and the corresponding background representation BGD1 of the sequence IS1, and SP2 describes the geometrical relation between each frame of IS2 and the corresponding background representation BGD2 of the sequence IS2.

The parameters describing the position of each frame within the background representation can be inferred also from a computation of the camera motion along the sequence, and from the geometrical mapping between any frame of the image sequence and the background representation.

If an image sequence has been recorded with a stationary camera whose angle of view is the same as used for background representation, the module 1 can be bypassed. In this case, if the background representation has the same field of view as the image sequences IS1 and IS2, the parameters are constant over time and correspond to a unitary transformation. As an example, the background may be recorded first, without any action figures, and the action recorded second from the same camera location and using the same view. The camera motion parameters SP1 and/or SP2 can be determined readily in case of an instrumented camera providing pan, tilt and zoom information, typically through a communication line.

E.2 Background/Foreground Extraction (Module 2)

Once it is known how each frame relates to the background representation, a weighted mask sequence describing the probability of a pixel to belong to the background can be computed. The technique involves using SP1 and SP2 for aligning each frame of IS1 and IS2, respectively, with the respective background BGD1 and BGD2.

Figure 9:
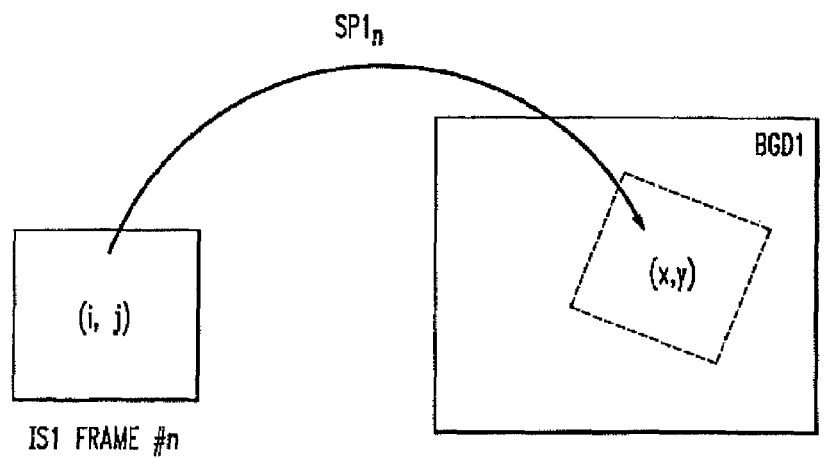
FIG. 9 is a schematic which illustrates spatial alignment of a frame with a background representation.

As represented by FIG. 9, to each pixel coordinate (i, j) in each frame of IS1 and IS2 there corresponds a coordinate (x, y) in BGD1 ion in (x, y) and a discrepancy measure is computed which can be used for pixel evaluation, e.g. based on certainty or sufficient probability for a pixel to belong to the background. Such evaluation can be automated, without precluding manual intervention as may be desirable where background and foreground are not readily distinguishable. Additionally, ancillary information may be used for classification, e.g. as to object shape, object position, minimal object dimensions, and/or temporal consistency and the like.

Figure 10:
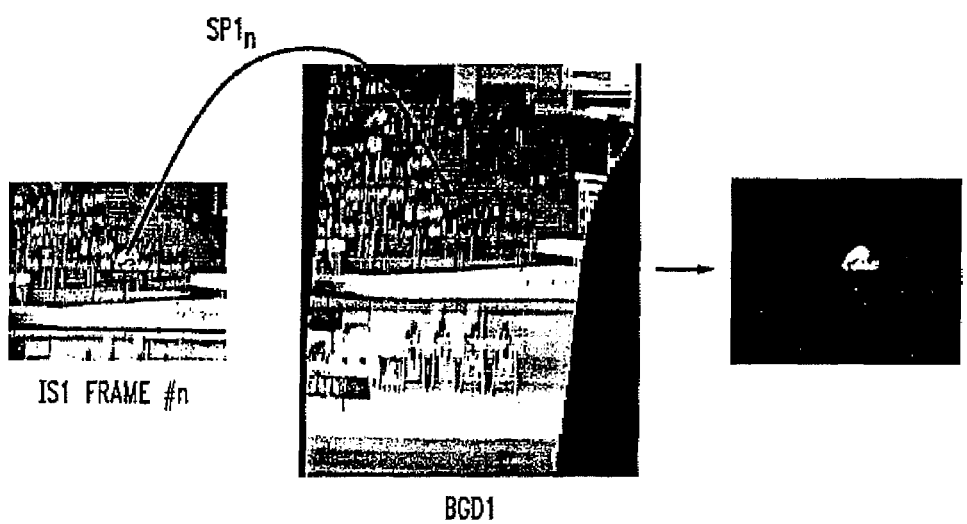
FIG. 10 is an illustration of spatial alignment of a frame with a background representation.

In correspondence with FIG. 9, FIG. 10 further illustrates background/foreground extraction in the case of a diver in mid-air. From the video sequence IS1 a background BGD1 has been determined as described above. The n-th frame of IS1 is aligned with its corresponding representation BGD1. The form of the diver is shown separately as extracted from IS1.

After distinguishing between foreground and background, further processing can include the determination of additional informative parameters, e.g. object size and the position of an object's center of gravity for which standard image processing techniques are known. Among uses of such information is relating it to a comparative model for the shape or motion of the object, e.g. for obtaining statistical data.

E.3 Spatial Normalization (Module 3)

The image sequences IS1 and IS2 can be aligned based on their geometric relationship. A spatial normalization transformation SNT can be used, e.g., for matching in size and/or position elements which are present in both image sequences, from the background and/or the foreground. Among examples of such elements in the background are the lines of a tennis or squash court, the poles in pole vaulting, and a standard element such as a purposely placed aluminum T-bar. Foreground examples include the size of a person, the length of his forearm, the length of a golf club, etc.

The SNT can be determined automatically, semi-automatically or manually. In automatic determination, identified similar elements in both image sequences are detected automatically, and the SNT is computed so that these elements are brought into correspondence by a geometrical transformation. For element identification, the weighted masks WM1 and WM2 can be used which discriminate between foreground and background. In semi-automatic determination, similar elements can be pointed out manually, e.g. by mouse clicking, with the SNT then determined automatically so as to match the elements. In manual determination, a user can modify the SNT parameters interactively, e.g. by mouse clicking, keyboard typing and/or any other suitable input device, until a satisfactory mapping is visually ascertained.

An SNT can be computed, e.g., so that the actual scale/position relationship between elements is maintained, or to normalize a pertinent element such as a person's height or forearm length. As a further example, for comparing left-handed and right-handed actions of the same or different persons, the SNT can provide for mirroring.

Typically, an SNT is determined between a pair of frames, one from each of the image sequences IS1 and IS2. Alternatively, the background representations BGD1 and BGD2 can be used for this purpose.

The SNT can be used to correct for camera misalignment, in case the image sequences have been recorded from different camera positions. The camera positions can be inferred if some elements of the environment are known or parametrically represented, e.g. the lines of a tennis or squash court or a T-bar purposely placed for reference in a field of view. A physical element, such as court lines may be canonical, e.g as specified by official rules of a sport.

The normalization transformation is 3-dimensional and can be derived using the relative camera positions. The images of one sequence, which are a projection on the focal plane of the one of the cameras, can then be re-projected onto the focal plane of the second camera at its different location, using a 3-dimensional coordinate transformation. Alternatively, the two image sequences can be re-projected onto an intermediate focal plane, e.g. corresponding to a camera location half-way between the two actual camera positions.

E.4 Compositing (Module 4)

SP1 and SP2 describe how each frame of the respective image sequences IS1 and IS2 relates to the respective backgrounds BGD1 and BGD2, and SNT describes how the two image sequences should relate. Accordingly, each frame of IS2 can be geometrically related to any frame in IS1 and conversely.

Once a frame of IS2 has been transformed and aligned with its corresponding frame in IS1, the two frames can be shown together, e.g. as blended in a single image or side-by-side on a split screen. The weight of each pixel of each of the two frames in the composite image depends primarily on three factors, namely (i) the weight masks WMS1 and WMS2 which for each pixel represent a classification/discrimination measure between background and foreground, (ii) the desired weight for the pixel in the composite image sequence, and (iii) the visual effect desired.

As to factor (ii), a pixel's desired weight can depend on whether the composite sequence should have the background of the image sequence IS1, of the image sequence IS2, or even some other desired background. For example, FIG. 16(a) shows a composite frame where the background of the first sequence has been retained, and FIG. 16(b) shows a composite frame where the background was chosen as a uniform black. Corresponding background representations and frames excerpted from the original sequences are shown in FIG. 15.

As to factor (iii), the visual effect desired may call for transparency of overlapping foreground objects, or it may be desired to simulate depth of field by showing one foreground object as in front of the other, for example. Means may be included also to permit an end-user to select transparency interactively, e.g. by mouse clicking, keyboard typing and/or any other suitable input device, until a satisfactory effect is visually ascertained. This operation can be performed jointly with interactive setting of spatial normalization. For example, two agents placed side-by-side preferably may appear solid, whereas a degree of transparency may be preferred in case of overlap.

E.5 Temporal Normalization

For some applications it can be of interest to remove the influence of the speed of execution of an action, in the interest of focusing on relevant factors such as position, alignment and trajectories. For example, when comparing golf swings it is particularly important to pay attention to body/club movement and position independently from the speed of execution which may vary depending on a player's morphology and strength. To this end, image sequences can be coordinated by temporal normalization, involving temporal "warping" which can be thought of as a transformation of the temporal axis. Such a transformation can map consecutive time instances $t_1$ through $t_n$, say, onto corresponding consecutive instances $t'_1$ through $t'_n$, e.g. piece-wise linear in the time interval from $t_1$ to $t_n$, or smoothly across the interval.

Figure 11:
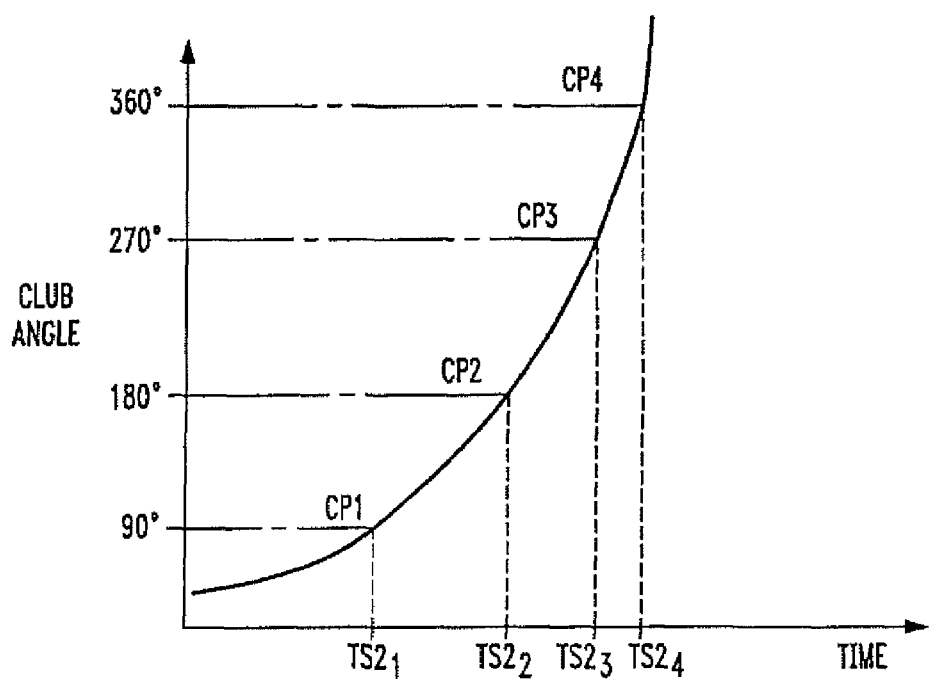
FIG. 11 is graph which shows control points in the execution of a golf swing.
Figure 12:
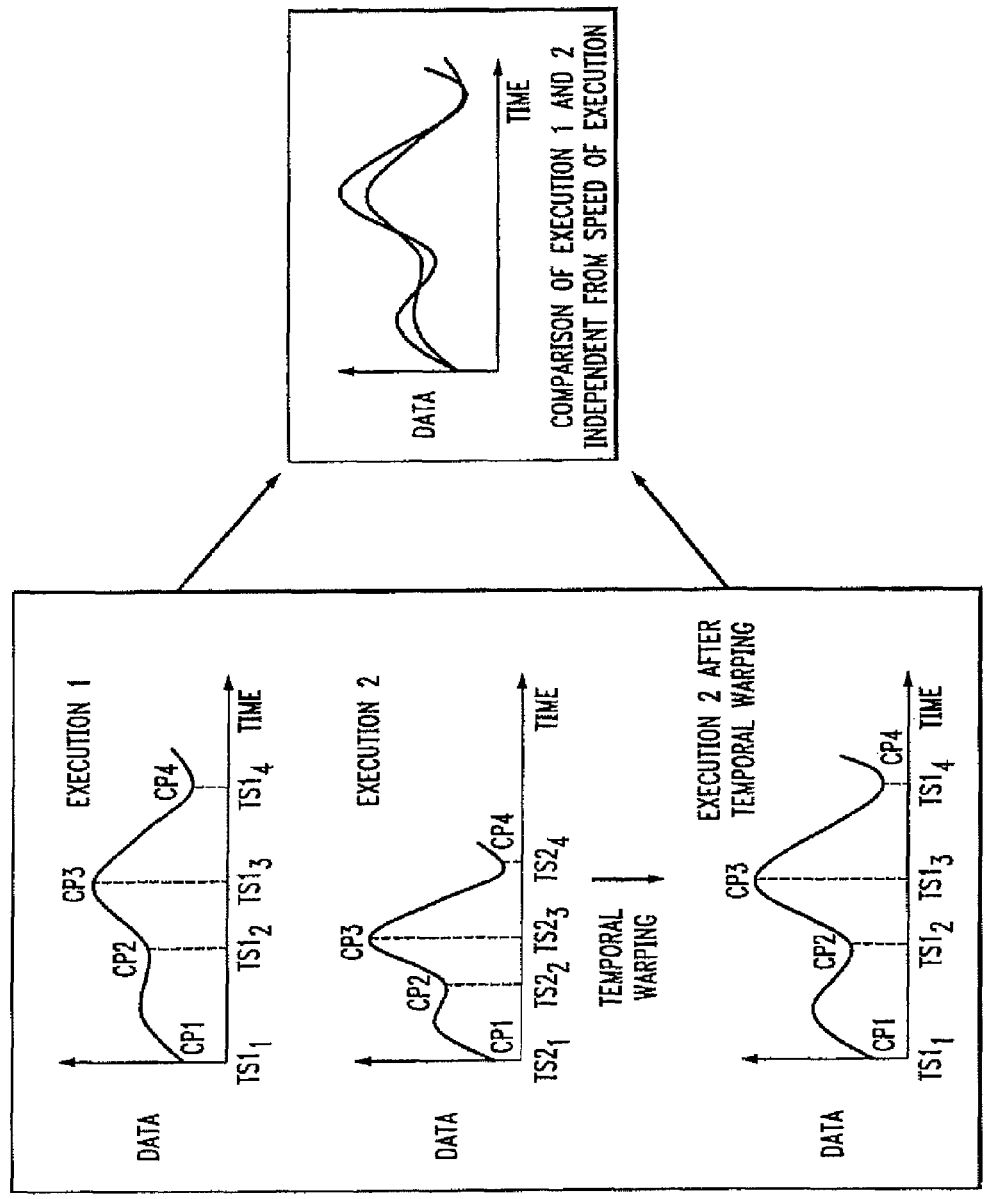
FIG. 12 consists of four graphs, of visual data versus time of a first and a second execution of a visual process, the second of the processes time-warped, and the time-warped process superposed with the first process.

A temporal transformation can be determined such that times of execution at selected control points are mapped into a specified set of instances. Advantageously for example, to compensate for speed differences in the execution of an action, either or both of the actions can be normalized for action control points to appear temporally coincident, as illustrated in FIG. 12. Examples of control points in a golf swing include the time of the vertical position of the club above the player (90°), passage at the horizontal of the club behind the player (180°) passage at the vertical position below the player (270°) and passage at the horizontal position in front of the player (360°). These control points are illustrated in FIG. 11 where the horizontal axis represents time and the vertical axis the club position in angular degrees.

Figure 13:
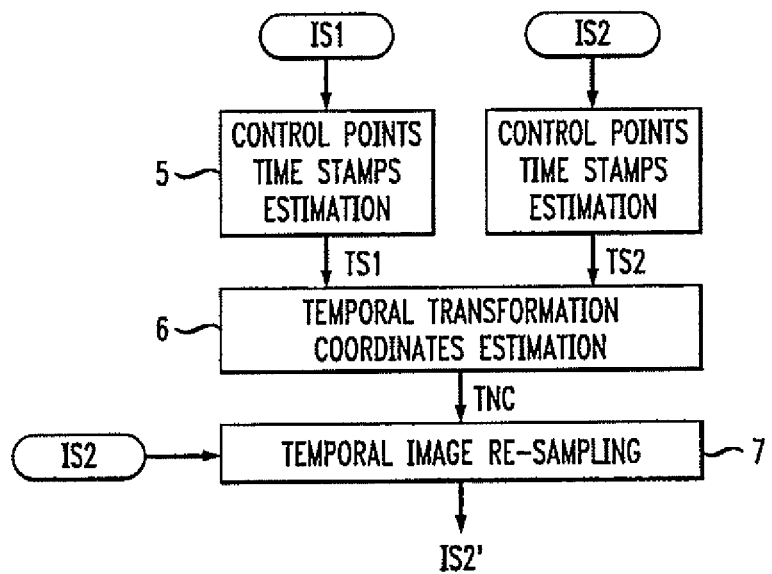
FIG. 13 is a block diagram of a preferred temporal normalization module.
Figure 14:
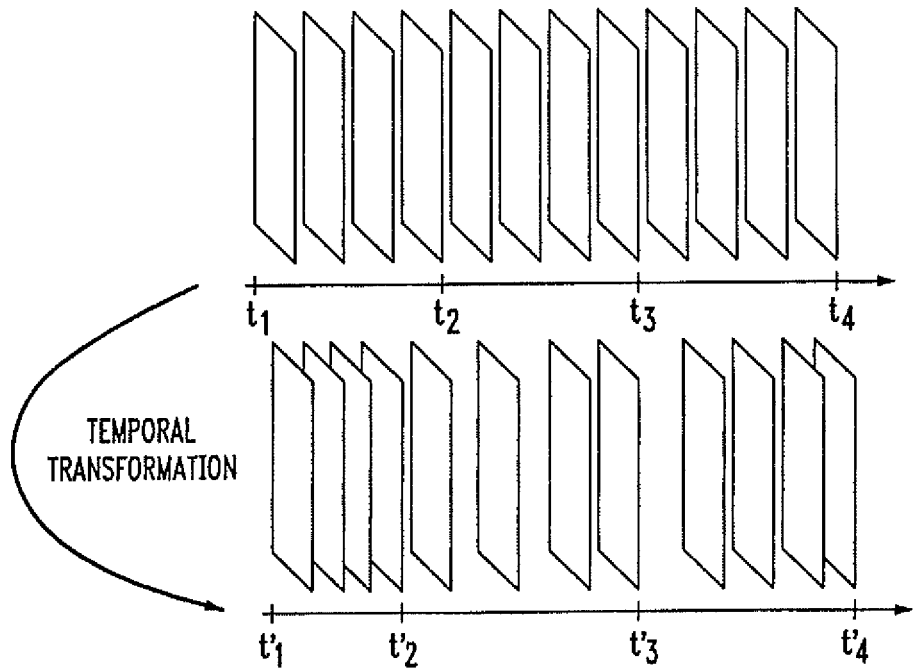
FIG. 14 is a schematic which illustrates temporal transformation.

As illustrated by the temporal normalization block diagram of FIG. 13, the image sequences IS1 and IS2 enter the module 5 which for both sequences determines the times of execution TS1 and TS2 of a pre-defined sequence of control points. This operation can be performed automatically or with user intervention. The sequences TS1 and TS2 enter module 6 which determines the transformation TNC for mapping the sequence TS2 onto the sequence TS1. Using the temporal transformation, the image sequence IS2 is re-sampled correspondingly, yielding the image sequence IST (module 7). Typically, as illustrated by FIG. 14, the sequence IS2 will not include images for the exact transformed time instances required, and re-sampling can benefit from interpolation between images of IS2 to generate artificial images for such instances. For optimized image quality, the motion along the sequence IS2 can be inferred from SP2 and used for interpolation along each pixel trajectory.

The set of times of execution of selected control points in a video can be stored along with the video for later use. In particular, video frames corresponding to the occurrence of control points can be tagged/indexed/marked as critical or key frames corresponding to a critical phase of a performance. Among uses of such indexing is the rapid retrieval of a critical phase of a performance. Also, the indexing can provide a semantic division of an image sequence into phases. In a long-jump performance, for example, the video frame corresponding to the start of the run can be marked as the beginning of an attempt, and the video frame corresponding to the take-off point can be marked as the beginning of the elevation phase.

After normalization, the sequence IS1 and the normalized sequence IS2' each will depict execution of an action with simultaneity at the control points.

Control points can be identified automatically through image analysis of a sequence. For example, in a golf swing the head of the club can be detected and tracked in the execution of the swing, and control points corresponding to club angles, e.g. of 90, 180, 270 and 360 degrees can be identified. Other signals can be used for control point identification, e.g. an acoustic signal from the impact of a golf club on the ball, or a radar signal or an optical signal, for example.

Time re-normalization can also be effected without using control points, as a dynamic programming technique can be used for any desired time warping Instead of aligning a number of control points, a global alignment can minimize a global error measure between the two or more video sequences. Such a technique has been used e.g. in speech recognition for aligning two utterances spoken at different speeds. In the present case, the technique is extended to 3 dimensions, with the dynamic programming algorithm finding an optimal nonlinear time warp that minimizes an error measure between the two video sequences. The dynamic programming algorithm searches various local time warps, under constraints, and keeps the one that is locally optimal. This enables alignment of video sequences which display comparable events but have different speeds locally.

While, as specifically described above, one image sequence (e.g. IS2) can be normalized with respect to another (IS1), normalization instead of both sequences with respect to a third reference is not precluded, in which case both image sequences will be re-sampled.

In a particularly simple embodiment, a single control point can be used, in which the temporal transformation amounts to a time shift. If the sequence of control points consists of two points, e.g. the beginning and end of an action, the temporal transformation amounts to a linear transformation of the temporal axis.

If temporal transformation is required, it can be applied to image sequences IS1 and/or IS2 prior to their entering the module 1, in which case IS1 and IS2 are replaced by IS1' and IS2' in FIG. 14, using the above notation.

In case a comparison is desired between a pre-recorded action and a live action in real time, the pre-recorded action can be temporally modified for synchrony with the live action. For example, when a routine executed by a live agent passes at a specified control point, the pre-recorded action can be temporally positioned, automatically, to display the same phase of execution. As learning an action can benefit greatly from repetition for memorizing, a golfer, say, may benefit from comparing repeated executions of his swing or portions thereof among each other and/or a role model.

E.7 Applications

The invention can be used to form composite sequences of sports actions, with sports-specific spatial and temporal synchronization. In gymnastics, for example, the control points for temporal normalization can be chosen as those instants where the gymnast touches the floor. Or, e.g. in figure skating, execution of figures can be temporally aligned between start and finish. Alternatively yet, sequences can be spatially normalized e.g. for the center of gravity of action figures to match up, as can be of interest for comparing different artistic interpretations of a ballet dance routine, for example.

The invention offers a capability for comparing agents performing in different locations, which is of special interest in learning actions such as a golf swing, for example. Thus, a golfer can compare his performance with that of a role model filmed elsewhere, as well as monitor his progress over time by comparing different performances of his own.

The invention further offers a capability for comparing in a single video a current performance with a reference performance. For example, in a track-and-field jump event, e.g. a long jump, a current jump performance can be filmed from an angle similar to that of a reference performance, e.g. a world-record jump. A spatial normalization transformation can be computed, e.g. so that the take-off pits and boards in the one footage match with those in the other in orientation and size. There results a single, combined video in which the two performances conveniently can be compared.

The invention can be used in real time to provide a user with feedback concerning his execution of an action, e.g. in aerobics where the student will attempt to align his form with that of the instructor.

While the description above is for an action recorded by a single camera, the technique also applies where multiple cameras are used. The technique then can be used individually, e.g. for each pair of cameras having the same viewing angle. Also, from multiple views a 3-dimensional representation can be generated akin to a three-dimensional moving model of a performer, and spatio-temporal normalization and background adaptation can be applied to such a representation as well.

The invention can be implemented on a non-transitory tangible medium having a representation of computer instructions for generating the non-transitory composite video sequence on a display device.

The invention claimed is:

1. A computer method for generating a composite video sequence from a plurality of given video sequences for display on a display device in communication with a computer processor, wherein each of the given video sequences comprises a representation of a respective one of a plurality of elements with action relative to a respective environment, the method comprising the steps of:
   (a) forming a background representation, using the computer processor, said background representation including a common environment;
   (b) aligning said plurality of given video sequences, using the computer processor, based on a matching in size and position of elements, from a background and/or from a foreground, which are present in at least two of the plurality of given video sequences;
   (c) forming the composite video sequence, using the computer processor, based on the formed background representation and the aligned video sequences; and
   (d) displaying the composite video sequence on the display device.

2. The method of claim 1, wherein step (a) comprises forming the background representation independent of any of the plurality of elements.

3. The method of claim 2, wherein the background representation is a single image recorded by a camera.

4. The method of claim 3, wherein forming the background representation comprises panoramically combining images from an image sequence.

5. The method of claim 4, wherein the image sequence is one of the given video sequences.

6. The method of claim 5, comprising updating the background representation so as to give preferential weight to more recent images of the given video sequence.

7. The method of claim 2, wherein the background representation comprises a parametric environmental representation.

8. The method of claim 2, wherein forming the background representation comprises associating a reliability measure to representational elements.

9. The method of claim 1, further comprising estimating a geometrical relation between a given video frame and a corresponding background representation.

10. The method of claim 9, wherein estimating comprises image analysis.

11. The method of claim 9, wherein estimating comprises taking into account instrument data furnished by an instrumented camera used in generating one of the given video sequences.

12. The method of claim 9, comprising (i) using the geometrical relation for aligning a given video frame and a corresponding background representation and (ii) associating with pixels a discrepancy measure between the aligned video frame and the background representation.

13. The method of claim 12, comprising using the discrepancy measure in determining a probability for a pixel of a given video frame to belong to background.

14. The method of claim 13, comprising using the discrepancy measure in classifying a pixel of a given video frame as belonging either to background or else to a foreground element.

15. The method of claim 14, wherein classifying takes auxiliary information into account.

16. The method of claim 14, comprising using the classification in inferring statistical data for the foreground element.

17. The method of claim 14, comprising using the classification in replacing the background with a different background.

18. The method of claim 1, wherein each of the given video sequences comprises representations of a respective plurality of elements with action relative to the respective environment.

19. The method of claim 1, wherein the elements are canonical elements.

20. The method of claim 1, comprising automated selection of the elements.

21. The method of claim 1, comprising accepting input for the selection of the elements.

22. The method of claim 1, further comprising identifying time of execution at least at one control point in the execution of an action performance.

23. The method of claim 22, wherein the identification is based at least in part on visual information in one of the given video sequence.

24. The method of claim 22, wherein the identification is based at least in part on an auxiliary signal.

25. The method of claim 24, wherein the auxiliary signal is one of an audio signal, an ultrasound signal, a microwave signal, a radar signal and an optical detector signal.

26. The method of claim 22, comprising storing identified time for later use along with a video sequence.

27. The method of claim 22, wherein time identification is automated.

28. The method of claim 22, comprising accepting input for time identification.

29. The method of claim 22, comprising determining a temporal transformation from one set of control points onto another.

30. The method of claim 22, comprising applying a temporal transformation to at least one of the given video sequences to generate a transformed sequence whose pace is adjusted for temporal matching at control points of given video sequences.

31. The method of claim 30, wherein one of the given video sequences is a reference video sequence, and wherein the temporal transformation is applied only to another given video sequence.

32. The method of claim 30, wherein the temporal transformation comprises offsetting an action performance in one given video sequences with an action performance in another given video sequence.

33. The method of claim 32, wherein offsetting is for controlling playback of a recorded given video so that time of execution at control points corresponds to time of execution in a live-performance given video.

34. The method of claim 30, comprising tagging/indexing/marking video frames of a given video sequence which represent a state of action at the control points.

35. The method of claim 22, comprising applying a non-linear temporal transformation to at least one of the video sequences.

36. The method of claim 35, wherein the transformation minimizes a global error measure between the video sequences.

37. The method of claim 36, comprising searching for minimization.

38. The method of claim 37, wherein searching is based on a dynamic programming technique.

39. The method of claim 1, further comprising choosing the respective environment of one of the given video sequences as the common environment.

40. The method of claim 1, further comprising choosing the common environment to be different from the respective environments of each of the given video sequences.

41. The method of claim 1, wherein step (c) comprises blending in forming the composite video sequence.

42. The method of claim 1, wherein step (c) comprises split-screen arranging in forming the composite video sequence.

43. The method of claim 1, wherein the given video sequences are from two sports performances.

44. The method of claim 43, wherein the two sports performances are in different respective environments.

45. The method of claim 44, wherein one of the sports performances is a reference performance.

46. The method of claim 45, wherein the reference performance is one of a world record performance, a national record performance, and a best personal performance.

47. The method of claim 45, wherein the performance other than the reference performance is one of a recent performance and a live performance.

48. The method of claim 43, wherein the sport is one of long jump, triple jump, high jump, pole vault, 100-meter race, and golf swing.

49. The method of claim 19, wherein the canonical elements are one of long-jump running pit lines, long-jump take-off board, 100-m race lanes, pole-vault poles, pole-vault bars, and high-jump bars.

50. The method of claim 1, further comprising the step of recording by an image recording device the plurality of given video sequences.

51. A system for generating a composite video sequence from a plurality of given video sequences wherein each of the given video sequences comprises a representation of a respective one of a plurality of elements with action relative to a respective environment, the system comprising:
(a) a computer processor forming a background representation, said background representation including a common environment;
(b) said computer processor aligning said plurality of video sequences, based on a matching in size and position of elements from a background and/or from a foreground which are present in at least two of the plurality of given video sequences with a visual element in another of the given video sequences, wherein said visual elements are background elements;
(c) said computer processor further forming the composite video sequence based on the formed background representation and the aligned video sequences; and
(d) a display device in communication with the computer processor, said display device displaying the composite video sequence.

52. A non-transitory tangible medium comprising a representation of computer instructions for generating a non-transitory composite video sequence from a plurality of given video sequences and displaying the composite video sequence on a display device, wherein each of the given video sequences comprises a representation of a respective one of a plurality of elements with action relative to a respective environment, the computer instructions comprising:
(a) instructions for forming a background representation, said background representation including a common environment;
(b) instructions for aligning said plurality of video sequences, based on a matching in size and position of elements from a background and/or from a foreground which are present in at least two of given video sequences;
(c) instructions for forming the non-transitory composite video sequence based on the formed background representation and the aligned video sequences; and
(d) instructions for displaying the non-transitory composite video sequence on the display device.

53. A computer method for generating a composite video sequence from a plurality of given video sequences and displaying the composite video sequence on a display device in communication with a computer processor, wherein each of the given video sequences comprises a representation of a respective one of a plurality of elements with action relative to a respective environment, the method comprising the steps of:
(a) forming a background representation using the computer processor, said background representation including a common environment, wherein for each video sequence a weighted mask sequence is computed, said weighted mask sequence describing the probability of a pixel to belong to the background;
(c) aligning said plurality of given video sequences using the computer processor, based on a matching in size and position of elements from a background and/or from a foreground which are present in at least two of the plurality of given video sequences;
(d) forming the composite video sequence, using the computer processor, based on the formed background representation and the aligned video sequences; and
(e) displaying the composite video sequence on the display device.

54. A computer method for a computer processor to generate a composite video sequence from a plurality of given video sequences wherein each of the given video sequences comprises a representation of a respective one of a plurality of elements with action relative to a respective environment, the method comprising the steps of:
(a) forming a background representation including a common environment, using the computer processor;
(b) ascertaining the representation of the respective one of the plurality of elements in each of the given video sequences, using the computer processor:
(c) coordinating the actions of the ascertained representations, using the computer processor, wherein said coordinating includes a spatial normalization between the given video sequences, for matching as to size and position a first visual element in one of the given video sequences with a second visual element in another of the given video sequences, wherein said visual elements are background elements;
(d) forming the composite video sequence based on the formed background representation and the coordinated representations, using the computer processor, such that the coordinated representations appear in the common environment; and
(e) displaying the composite video sequence on a display device.

* * * * *